Aug. 13, 1940.　　　　C. J. ZINKE　　　　2,211,193
WEIGHING SCALE
Filed June 23, 1938
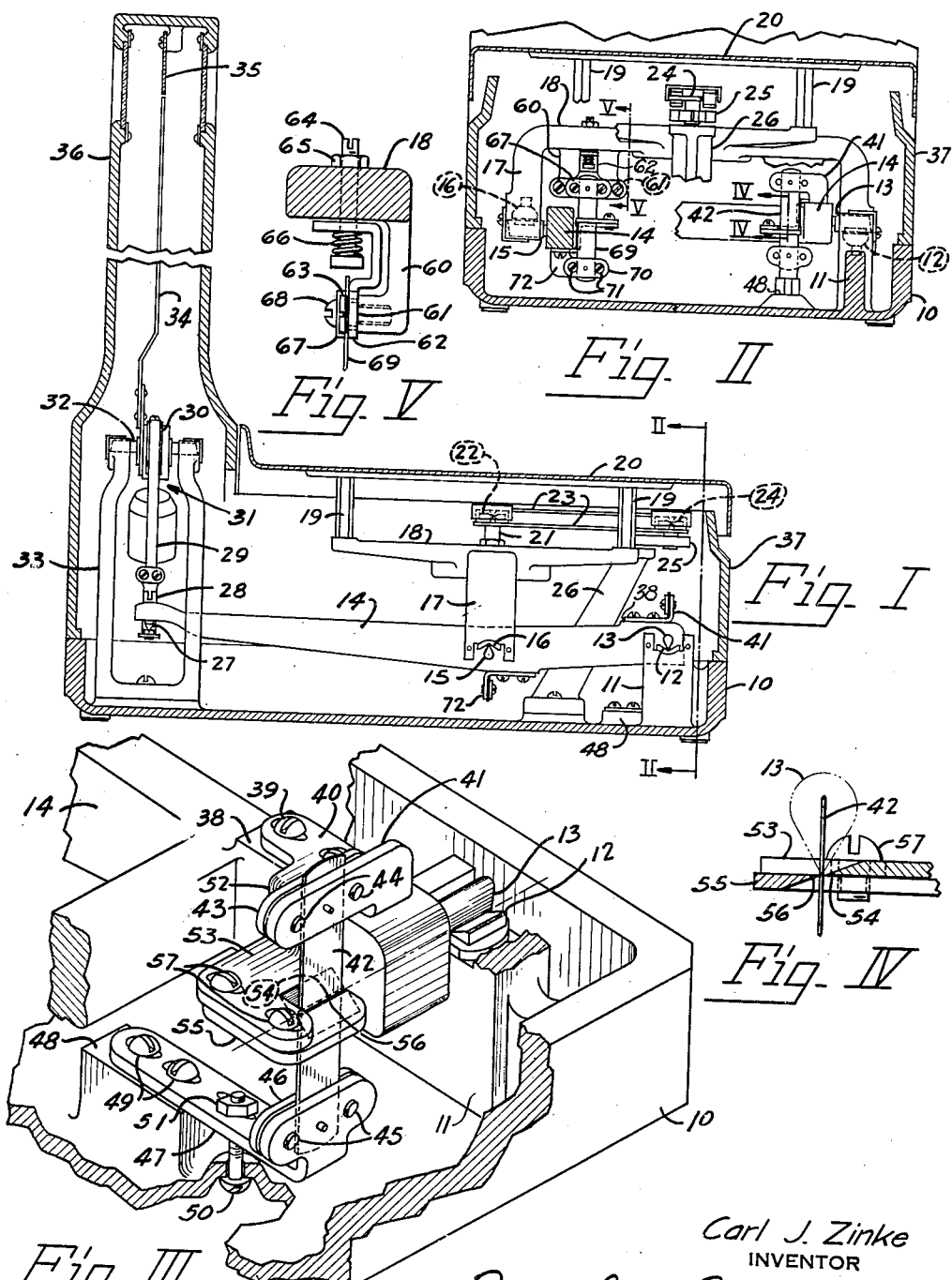
Carl J. Zinke
INVENTOR
BY Marshall & Marshall
ATTORNEYS Patented Aug. 13, 1940

2,211,193

UNITED STATES PATENT OFFICE 2,211,193

WEIGHING SCALE

Carl J. Zinke, Toledo, Ohio, assignor to Toledo Scale Company, Toledo, Ohio, a corporation of New Jersey Application June 23, 1938, Serial No. 215,368

12 Claims. (Cl. 308—2)

This invention relates generally to weighing scales, and more particularly to weighing scales used in retail shops. Scales of this kind must be relatively small, light in weight and easily handled since in modern stores these scales are frequently changed to different positions as the goods are changed about for display purposes. To obtain lightness in weight it is now customary to construct as many of the parts as possible from aluminum alloys, which combine the necessary lightness and strength, and encase such scales in housings molded from light weight synthetic resins. This necessitates, however, that means be provided which prevent shifting of the relatively movable parts.

The necessity of means for preventing scale pivots and bearings from disengaging was recognized early in the history of the commercial scale industry and many solutions of the problem have been suggested in prior patents. Invariably these suggestions were modifications of one idea, namely the provision of opposed, aligned knife edges engaged by opposed bearings, such as shown, for example, in Patent 895,125 to J. L. Theobald. It is, however, very difficult, and therefore comparatively expensive, to align three or four knife edges with such exactness as is necessary in scale construction.

The present invention has for its primary object the provision of improved, inexpensive and compact means for maintaining constant engagement of pivots and bearings.

Another object of the invention is the provision of improved means for maintaining constant engagement between a pivot and a bearing in relatively movable scale parts without resorting to opposed and aligned pivot edges.

A still further object is the provision of improved means for maintaining constant engagement of a pivot and a bearing by securing the ends of a tensioned flexible metallic ribbon to relatively movable scale members; and, A further object is the provision of means, in such construction, for causing such ribbon to bend at one axis only.

These, and other objects and advantages will be apparent from the following description in which reference is had to the accompanying drawing, illustrating a preferred embodiment of the invention and in which similar reference numerals designate similar parts throughout the several views.

Referring to the drawing:

Fig. I is a sectional, side elevational view of the scale embodying the invention.

Fig. II is a section thereof substantially along the line II—II of Figure I in which a portion of the lever is broken away to show the adaptation of the invention to another bearing couple of the scale.

Fig. III is an enlarged perspective view of the device as applied to the fulcrum pivot of a scale.

Fig. IV is an enlarged fragmentary view of the means for causing the ribbon to bend along one axis, sectioned substantially along the line IV—IV of Fig. II, and, Fig. V is an enlarged fragmentary, sectional view substantially along the line V—V of Fig. II.

Referring to the drawing in detail:

The scale in which the invention is shown embodied must be regarded as illustrative only since the invention is adaptable for use with any type of scale in which knife edges are employed as pivots.

A base 10, preferably in the form of a rigid casting, is provided adjacent one of its ends with a pair of upwardly extending bosses 11 which are machined at their upper ends to receive self aligning bearings 12 upon which fulcrum pivots 13 of a load supporting lever 14 are oscillatingly mounted. Extending outwardly from the lever 14, in spaced relation to the fulcrum pivot 13, are a pair of load pivots 15. Bearings 16 positioned in the downwardly extending arms 17 of a load supporting spider 18 are oscillatingly mounted upon the pivots 15. A plurality of posts 19 studded into arms of the spider 18 support a load receiver platter 20.

To maintain the condition of level of the platter 20 and spider 18, this spider 18 is provided with an upwardly extending post 21 to which a pivot plate 22 having opposed knife edges is riveted. These knife edges are engaged by bearings in one end of a check link 23 of known construction. Bearings in the other end of this check link engage a similar pivot plate 24 riveted to the end of a stud upstandingly secured in a plate 25 which is adjustably mounted on an upwardly extending bracket 26 bolted to a suitable machined pad in the base 10. The free, or nose end of the lever 14 has a downwardly directed cone pivot 27 which engages a suitable bearing in a stirrup 28 clamped to the lower end of a metallic ribbon 29 whose upper end overlies the arcuate face of a power sector 30. This power sector forms a part of a load counterbalancing pendulum 31, which, by means of a pivot 32, is fulcrumed upon a pendulum stand 33 bolted to the base 10. An upwardly extending indicator 34 is fastened to the pendulum for cooperation with a chart 35 fixed in the upper end of a housing 36 mounted on one end of the base 10. This housing 36, as well as a base frame 37, in cooperation with the base 10 and the platter 20, completely encloses the mechanism of the scale.

The scale thus far described will indicate weights, and if so designed, values for any commodity within its capacity placed upon the platform in the well known usual manner.

As hereinbefore stated, it is an object of this invention to provide means for preventing disengagement of pivots and bearing when the scale is moved or for any other reason that might cause such disengagement. To accomplish this, the lever 14 is provided with a machined pad 38 to which is adjustably fixed, by means of screws 39, a ribbon retaining bracket 40. This bracket is provided with an upturned extending end 41 to which is clamped the upper end of a flexible metallic ribbon 42 by means of a clamp plate 43 and screws 44. The lower end of this ribbon 42 is clamped to an upturned end, by means of screws 45 and clamping plate 46, of a bracket 47. This bracket 47 is fastened, by means of screws 49, in overhanging relation to the upper face of a machined boss 48 extending upwardly from the bottom of the base 10 by means of screws 49.

The bracket 47 is preferably made from highly elastic material, such as steel, so that the overhanging portion will act as a spring. This overhanging portion may be initially bent downwardly a slight amount so as to exert a predetermined pull on the ribbon or, as shown in the drawing, a screw 50 may penetrate the bottom of the base and extend through an elongated slot in the overhanging portion of the member 47 and threaded into a nut 51. It is obvious that by means of the screw 50 the amount of tensile force on the ribbon 42 may be varied as desired. This tensile force on the ribbon however must at all times be sufficient to prevent the disengagement of the knife edge in the lever from its bearing surface.

It is also obvious that in this construction it is necessary that the ribbon 42 be adjustable so that it may be positioned to lie in the vertical plane which passes through the knife edge of the pivot 13. When the angular movement of the lever is very slight the means just described will be sufficient to retain the edge of the pivot 13 in constant engagement with the bearing 12 without having reactive influence on the operation of the scale but when, as is usually the case in computing scales, the angle through which the lever 14 oscillates is considerabe then means must be provided so that the tensile force acts on the lever only at the intersection of the planes passing horizontally and vertically through the edges of the pivots 13.

In the embodiment shown these means comprise a downwardly bent portion 52 of the bracket 40, the lower end 53 of this downwardly turned portion is then bent laterally in a horizontal plane and provided with a milled section forming a knife edge 54 on the bottom face. The distance between the lower face of the bracket 40 in contact with the lever 14 and the lower face of the horizontal portion 53 is equal to the distance from the knife edge of the pivot 13 to the machined surface of the pad 38. The edge 54 is in the plane of the surface of the upturned extending portion 41 to which the ribbon 42 is clamped. When, through the action of a load, the lever 14 is rocked downwardly the ribbon 42 will bend along the line of contact with the edge 54. For the purpose of preventing the ribbon 42 buckling in the opposite direction, a plate 55 is provided. This plate has a milled knife edge 56 which faces the edge 54 and is clamped to the bottom surface of the horizontally extending portion 53 by means of screws 57 passing through elongated slots in the portion 53 and threaded into the plate 55. This plate 55 is assembled in adjusted relation so that the edge 56 engages the other face of the ribbon 42. It will be seen that the edges 55 and 56 lie in the same plane since they are on those surfaces of the members 53 and 55 which engage each other.

Similar means are provided for maintaining the engagement of the pivots 15 with the bearings 16. The spider 18 is provided with a downwardly extending flange 60 (Fig. V) having a horizontally projecting face 61 to which a vertical face of a punched and formed bracket 62 is slidably clamped by means of shoulder screws 63 passing through elongated slots. The outer face of this portion of the bracket 62 lies substantially in the vertical plane passing through the edge of the pivot 15. The upper end of this bracket 62 is formed U shaped and a screw 64 passes through an aperture in its upper flange and an aperture in the spider 18 and is then threaded into a nut 65 resting on the upper surface of the spider. A compression spring 66 is interposed between the head of the screw and the flange of the bracket 62. The stiffness of this spring 66 must be sufficient to prevent disengagement of the knife edge and its bearing surface under abnormal conditions. Clamped to the lower vertical portion of the bracket 62, by means of a clamp plate 67 and screws 68, is a ribbon 69 which performs the same function as the ribbon 42. The lower end of this ribbon 69, by means of a clamping plate 70 and screws 71, is clamped to a bracket 72 which is adjustably secured to the underside of the lever 14. This bracket 72 performs the same function in retaining the pivot 15 as the bracket 40 performs in respect to the pivots 13, is substantially similar in design and, therefore, requires no further description.

The necessary tension is applied to the ribbon 69 by turning the screws 64 against the bias of the spring 66 which is compressed and then resiliently exerts a constant upward thrust, and through the ribbon 69 holds the pivots 15 and the bearings 16 in constant engagement.

In the aforegoing description and in the illustrations brackets adjustably secured to the lever are provided for clamping engagement with ends of the ribbons 42 and 69. It is obvious, however, that the lever at these points may be provided with integral projecting bosses adapted to be properly machined; in fact, the embodiment of the invention herein shown and described is to be regarded as illustrative only and it is to be understood that the invention is susceptible to variation, modification and change within the spirit and scope of the subjoined claims.

Having described the invention, I claim:

1. In a device of the class described, in combination, weighing mechanism including a lever, a pivot in said lever, a bearing for said pivot and means including a flexible means for exerting constant pressure on said pivot, said flexible means comprising a metallic ribbon.

2. In a device of the class described, in combination, weighing mechanism including a lever, a pivot in said lever, a bearing for said pivot and means including a flexible means for exerting constant pressure on said pivot, said flexible means comprising a metallic ribbon and means fixed to said lever and engaging said ribbon substantially in axial alignment with said pivot for causing said flexible metallic ribbon to bend along one axis only.

3. In a device of the class described, in combination, weighing mechanism including a lever, a pivot in said lever, a bearing for said pivot and means including a flexible means for exerting constant pressure on said pivot, said flexible means comprising a metallic ribbon and means fixed to said lever and engaging said ribbon substantially in axial alignment with said pivot for causing said flexible ribbon to bend along one axis only, said means including a pair of knife edges.

4. In a device of the class described, in combination, a weighing scale comprising load supporting means including a lever, a fulcrum for said lever, a load supporting spider and a fulcrum on said lever for said load supporting spider and flexible metallic ribbons extending between said lever and its fulcrum and said spider and its fulcrum.

5. In a device of the class described, in combination, a weighing scale including a base, a bearing mounted on said base, a pivot in said lever and mounted upon said bearing, a bracket secured to said lever and engaging one end of a metallic ribbon, a bracket secured to said base and to the other end of said metallic ribbon and said bracket on said base being adjustable for varying the tension and alignment of said metallic ribbon.

6. In a device of the class described, in combination, a weighing scale including a base, a bearing mounted on said base, a pivot in said lever and mounted upon said bearing, a bracket secured to said lever and engaging one end of a metallic ribbon, a bracket secured to said base and to the other end of said metallic ribbon and said bracket on said base being adjustable for varying the tension and alignment of said metallic ribbon and said bracket on said lever having a knife edge in coincidence with the knife edge in said lever.

7. In a device of the class described, in combination, a weighing scale including a base, a bearing mounted on said base, a pivot in said lever and mounted upon said bearing, a bracket secured to said lever and engaging one end of a metallic ribbon, a bracket secured to said base and to the other end of said metallic ribbon and said bracket on said base being adjustable for varying the tension and alignment of said metallic ribbon, said bracket on said lever having a knife edge in coincidence with the knife edge in said lever and a second knife edge adjustably secured to said bracket opposite first knife edge and in coincidence with it.

8. In a device of the class described, in combination, a weighing scale including a base and a load supporting lever, a bearing mounted on said base, a pivot in said lever and mounted upon said bearing, a bracket adjustably secured to said lever and engaged by one end of a metallic ribbon, a bracket adjustably secured to said base and to the other end of said metallic ribbon and said bracket secured to said base being elastic and so mounted as to exert a predetermined tensile force on said ribbon.

9. In a device of the class described, in combination, a weighing scale including a base, a load supporting lever mounted upon said base, a load pivot fixed to said lever, a load supporting spider mounted on said load pivot, a vertically adjustable bracket and means secured to said spider for adjusting said bracket, a bracket secured to said lever and a flexible metallic ribbon extending between said bracket on said spinder and said bracket on said lever.

10. In a device of the class described, in combination, a weighing scale including a base, a load supporting lever mounted upon said base, a load pivot in said lever, a load supporting spider mounted on said load pivot, a vertically adjustable bracket and means secured to said spinder for adjusting said bracket, a bracket secured to said lever and a flexible metallic ribbon extending between said bracket on said spider and said bracket on said lever, said means for adjusting said vertically adjustable bracket on said spider including a spring for constantly exerting a tension on said ribbon.

11. In a device of the class described, in combination, a weighing scale including a frame, a lever, a knife edge fulcrum pivot and bearing for said lever, a spider, a knife edge load pivot and bearing supporting said spider upon said lever, and flexible metallic ribbons extending between said lever and said frame and between said spider and said lever, the ends of said flexible metallic ribbons being adjustably secured to the parts between which said ribbons extend, whereby said ribbons cooperate to restrain forces tending to tilt said spider from separating said pivots and bearings.

12. In a device of the class described, in combination, a weighing scale including a frame, a lever, a knife edge fulcrum pivot and bearing for said lever, a spider, a knife edge load pivot and bearing supporting said spider upon said lever, flexible metallic ribbons extending between said lever and said frame and between said spider and said lever, the ends of said flexible metallic ribbons being adjustably secured to the parts between which said ribbons extend, whereby said ribbons cooperate to restrain forces tending to tilt said spider from separating said pivots and bearings, and adjustable means for placing said ribbons under tension.

CARL J. ZINKE.